United States Patent [19]

Yoneda et al.

[11] 4,233,836
[45] Nov. 18, 1980

[54] KNOCKING DETECTION SYSTEM FOR INTERNAL COMBUSTION ENGINE

[75] Inventors: Kenji Yoneda, Fujisawa; Yasuo Takagi, Yokohama, both of Japan

[73] Assignee: Nissan Motor Company, Limited, Yokohama, Japan

[21] Appl. No.: 33,347

[22] Filed: Apr. 26, 1979

[30] Foreign Application Priority Data

May 1, 1978 [JP] Japan ................. 53-59311[U]

[51] Int. Cl.³ ..................... G01L 23/22; G01M 15/00
[52] U.S. Cl. .......................................... 73/35; 73/654; 73/660
[58] Field of Search .................. 73/35, 651, 652, 654, 73/660

[56] References Cited

U.S. PATENT DOCUMENTS

| | | | |
|---|---|---|---|
| 2,560,734 | 7/1951 | Mowzon | 73/35 |
| 2,607,215 | 8/1952 | De Boisblanc | 73/35 |
| 3,002,062 | 9/1961 | Globe | 73/654 X |
| 4,002,155 | 1/1977 | Harned et al. | 73/35 X |
| 4,012,942 | 3/1977 | Harned | 73/35 |
| 4,153,020 | 5/1979 | King et al. | 73/35 X |
| 4,161,665 | 7/1979 | Buck et al. | 73/3.5 X |

*Primary Examiner*—James J. Gill
*Attorney, Agent, or Firm*—Schwartz, Jeffery, Schwaab, Mack, Blumenthal & Koch

[57] ABSTRACT

A system for detecting the intensity of knocking of an internal combustion engine such as an automotive gasoline engine, comprising a vibration sensing device attached to an engine body and electrical circuitry for producing a knock-indicating signal based on a comparison of a vibration-indicating signal derived from the vibration sensing device with a reference signal which is variable depending on the rate of engine revolution. The vibration sensing device comprises a vibration pickup such as of an accelerometer type, preferably mounted on a resonance plate which is fixed only at its one end to the engine body, and is made to have a resonance frequency within a frequency band of vibrations attributable to knocking of the engine, such as 5 to 10 KHz, so that no band-pass filter is needed in this system.

6 Claims, 9 Drawing Figures

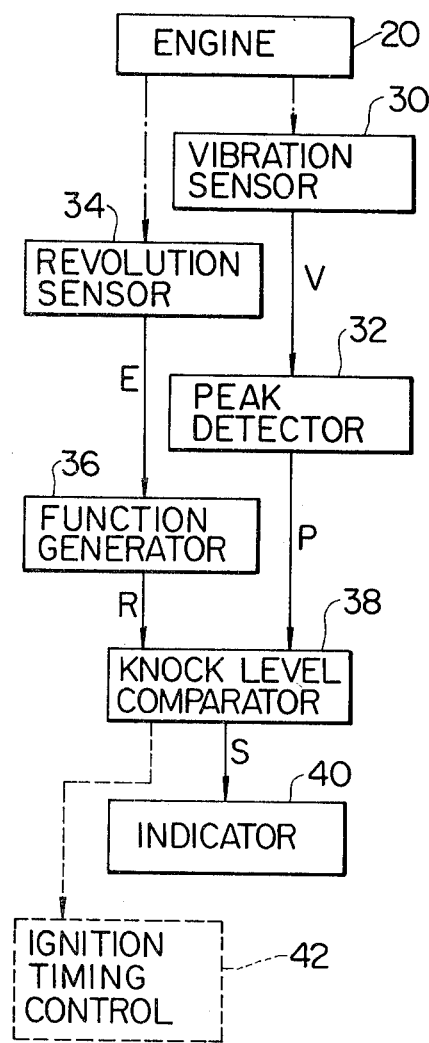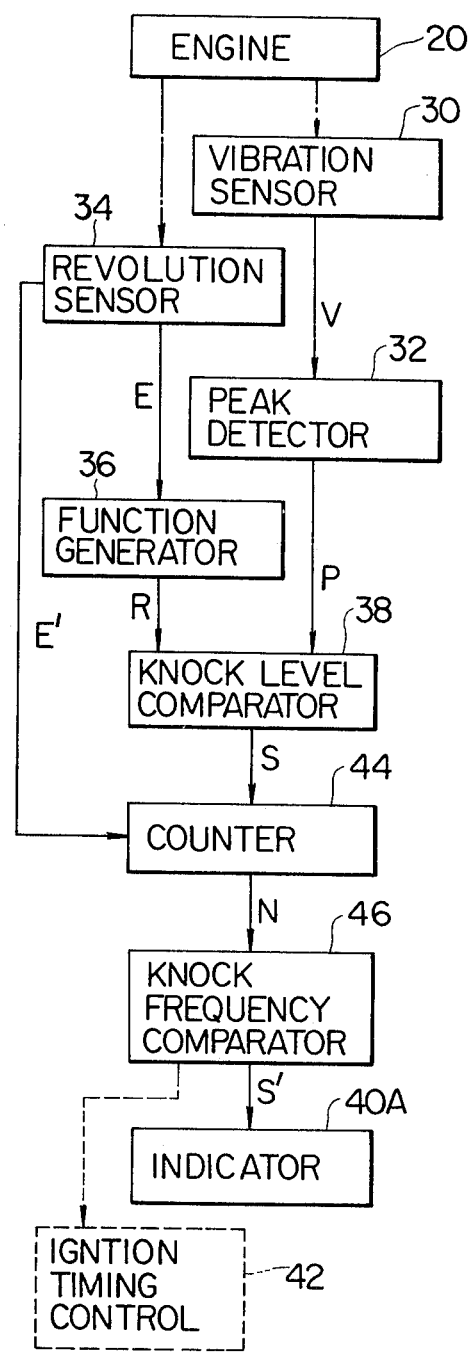

KNOCKING DETECTION SYSTEM FOR INTERNAL COMBUSTION ENGINE

BACKGROUND OF THE INVENTION

This invention relates to a system for detecting the degree of knocking of an internal combustion engine, particularly, on an automobile.

Concerning internal combustion engines and particularly automotive gasoline engines, it has been proposed to detect the intensity or degree of knocking of an engine by means of a system having a vibration pickup, such as an accelerometer which provides an electrical signal, mounted on the engine body and band-pass filters through which is passed the output signal of the vibration pickup to take out only a paticular vibration component within a frequency band considered to be attributable to knocking of the engine. The vibration signal passed through the filters is subjected to a certain treatment such as a comparison of amplitude peaks with a reference signal thereby to detect the degree of knocking.

As a disadvantage of this system from a practical viewpoint, this system needs to include a complicated circuitry because of the use of band-pass filters and hence becomes considerably costly.

SUMMARY OF THE INVENTION

It is an object of the present invention to provide an improved system for detecting the degree of knocking of an internal combustion engine such as automotive gasoline engine, which system utilizes no band-pass filter and features simplicity of construction as well as satisfactoriness of knocking detection ability.

A system according to the invention for the detection of the degree of knocking of an internal combustion engine comprises a vibration sensing device, which is attached to a body of an internal combustion engine and comprises a vibration pickup capable of converting mechanical vibrations into electrical signals. This vibration sensing device has a resonance frequency within a frequency band of vibrations attributable to knocking of the engine. The detection system further comprises a reference signal producing means for producing an electrical reference signal which is variable depending on the rate of revolution of the engine and signal treatment means for producing an electrical knock-indicating signal representing the degree of knocking of the engine based on a comparison of an electrical vibration-indicating signal derived from the vibration sensing device with the aforementioned reference signal.

A preferred example of the vibration sensing device in a system according to the invention comprises a resonance plate fixed only in one end region to the engine body and a vibration pickup, which is preferably of the type having a seismic mass resiliently held in a housing, fixedly mounted on the resonance plate in a free end region of the plate. The assembly of the resonance plate and the vibration pickup as a whole is made to have a resonance frequency in a range as specified above.

Usually the vibration sensing device in a system of the invention is made to have a resonance frequency in the range from about 5 KHz to about 10 KHz.

BRIEF DESCRIPTION OF THE DRAWINGS

FIG. 6 is a block diagram of a knocking detection system as an embodiment of the invention;

FIG. 8 is a block diagram of another embodiment of the invention; and

DESCRIPTION OF THE PREFERRED EMBODIMENTS

Figure 1:
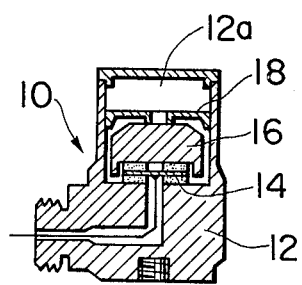
FIG. 1 is a sectional view of a conventional accelerometer useful as a vibration pickup in a knocking detection system according to the invention.

FIG. 1 shows a conventional accelerometer 10 as an example of electromechanical transducers capable of converting mechanical vibrations into electrical signals. This accelerometer 10 is of use as a vibration pickup either in the aforementioned conventional knocking detection system or in a system according to the invention. Essentially, this pickup 10 is made up of a housing 12 defining therein a chamber 12a, a piezoelectric element 14 which is piezoelectric ceramic material placed in the chamber 12a to rest on a chamber wall, a seismic mass 16 placed on the piezoelectric element 14 and a spring 18 installed in the chamber 12a so as to resiliently hold the seismic mass 16 against the piezoelectric element 14. The piezoelectric element 14 produces a voltage signal in response to deflection of the seismic mass 16 caused by mechanical vibrations of, for example, an engine body to which is attached the pickup 10. The mass of the seismic mass 16 and the spring constant of the spring 18 are predetermined such that the pickup 10 has a considerably high resonance frequency (usually about 50 KHz). Where this pickup 10 is attached to an internal combustion engine body, therefore, the output of this pickup 10 exhibits a flat frequency-gain characteristic in a frequency range of vibrations occurring during normal operation of the engine. (The meaning of the term "normal operation" includes operation conditions with some knocking.) For this reason, band-pass filters are indispensable for the aforementioned conventional knocking detection system in order to take out only a particular vibration component within a frequency band attributable to knocking (such a frequency band will be referred to as "knocking frequency band").

In a preferred embodiment of the present invention, a vibration pickup such as the one illustrated in FIG. 1 is assembled with another member to constitute a vibration sensing device, which has a resonance frequency within a knocking frequency band for an engine to which is applied the knocking detection system. In general, a knocking frequency band for an internal combustion engine is a range of 5–10 KHz, and a somewhat narrower range of about 6.5–8.0 KHz for an automotive gasoline engine.

Figure 2:
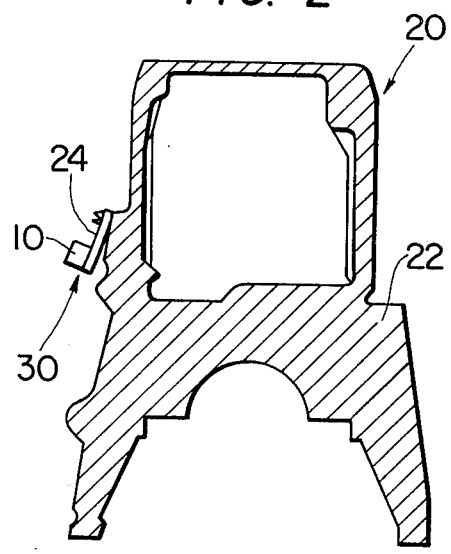
FIG. 2 shows explanatorily the manner of mounting a vibration detection device, which is a component of a system according to the invention, on an engine body.
Figure 3:
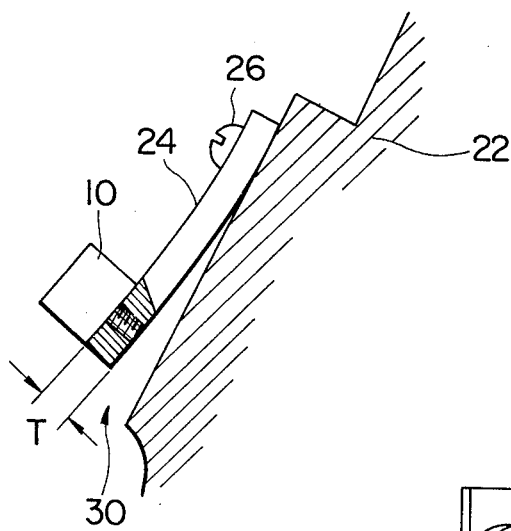
FIG. 3 is a partial enlargment of FIG. 2.
Figure 4:
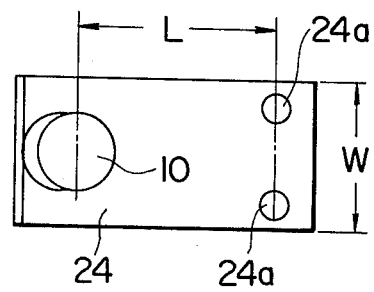
FIG. 4 is a plan view of the vibration detection device shown in FIGS. 2 and 3.

FIGS. 2 to 4 show a preferred embodiment of a vibration sensing device 30 according to the invention in a state attached to an engine body 20, more particularly to a cylinder block 22. This device 30 is made up of a resonance plate 24, which is a slightly warped rectangular plate of a metal in this case and in one end region is fixed to a side surface of the cylinder block 22 by means of setscrews 26, and the vibration pickup 10 of FIG. 1 of which housing 12 is fixedly mounted on the resonance plate 24 at a location close to the free end of the rectangular plate 24. (Leads extending from the pickup 10 are omitted from illustration.) Accordingly, the vibration sensing device 30 as a whole can make oscillatory movements relative to the engine body 20, and the resonance frequency $f_O$ of this device 30 is expressed as follows.

$$f_O = \frac{1}{2\pi}\sqrt{\frac{k}{m_1 + 0.23\, m_2}}$$

where k represents the spring constant of the resonance plate 24, $m_1$ is the mass of the vibration pickup 10, $m_2$ is the mass of the resonance plate 24, L is the distance between the center of the pickup 10 and the center of the screws 26 (or holes 24a bored through the plate 24 as shown in FIG. 4). As will be understood, the spring constant k of the resonance plate 24 is expressed by $k=(3EI_z/L^3)$ where E is the Young's modulus of the resonance plate, and $I_z$ is the second moment of inertia of the resonance plate, given by $I_z=(1/12)WT^3$ where W is the width of the resonance plate 24, and T is the thickness of the resonance plate.

The resonance frequency $f_O$ of the vibration sensing device 30 can optionally be determined by varying the material and dimensions of the resonance plate 24. Since a knocking frequency band for an internal combustion engine is usually a range of about 5–10 KHz, and about 6.5–8.0 KHz for an automotive gasoline engine, as mentioned hereinbefore, the vibration sensing device 30 is designed so as to have a resonance frequency $f_O$ of, for example, 7 KHz. Then the sensing device 30 can pick up only vibrations attributable to engine knocking with particularly high gain among wide frequency range vibrations of the engine, no band-pass filter (electrical) is needed in a knocking detection system according to the invention.

Figure 5:
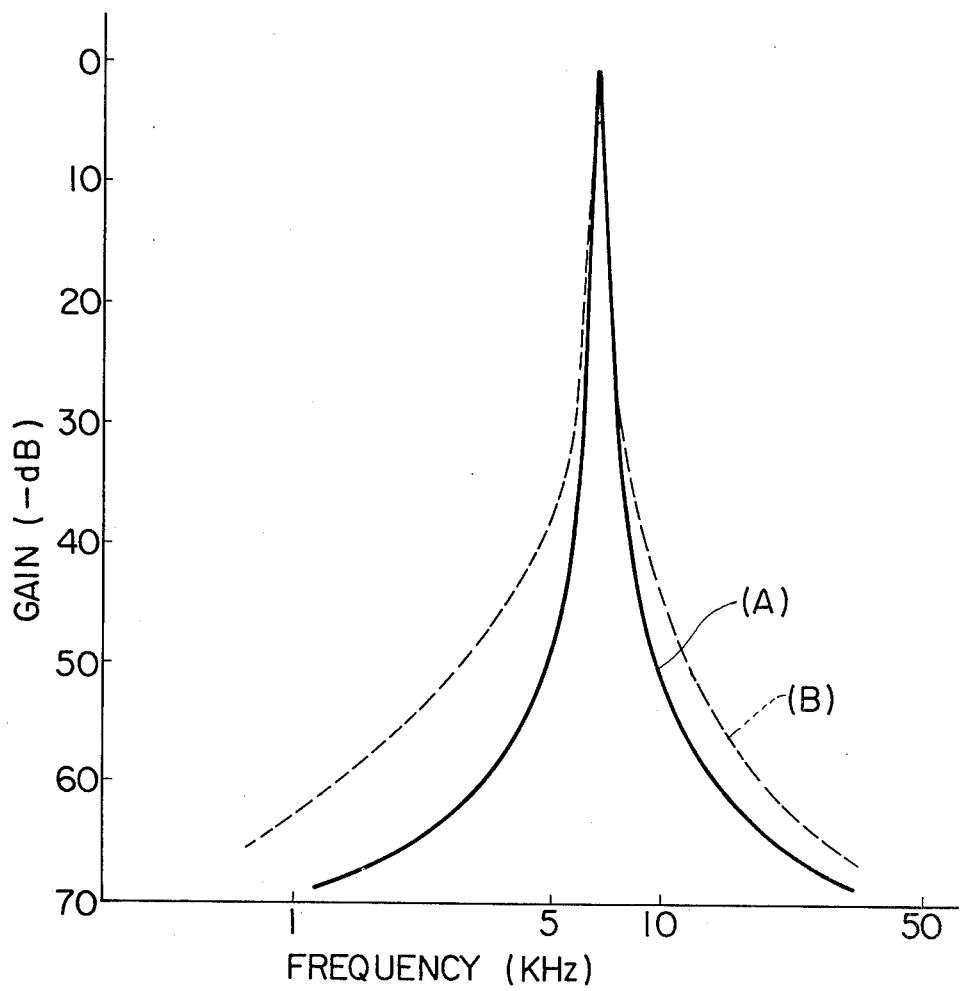
FIG. 5 is a comparison between a conventional knocking detection system and a system according to the invention with respect to frequency-gain characteristics of vibration sensing components.

In FIG. 5, the curve (A) represents an experimental frequency characteristic of the vibration sensing device 30 of FIGS. 2–4 designed to have a resonance frequency $f_O$ of 7 KHz. When the same vibration pickup 10 was tested in a state detached from the resonance plate 24 and combined with band-pass filters as in a conventional knocking detection system, the frequency characteristic was as represented by the curve (B) in FIG. 5. This comparison demonstrates satisfactoriness of the knocking detection ability of a simplified system according to the invention.

It is preferable and quite advantageous in practical applications to constitute a vibration sensing device in a system of the invention by mounting a vibration pickup on a resonance plate, but the use of a resonance plate is not an absolute requisite to this system. It is possible to utilize solely a vibration pickup, for example the pickup 10 of FIG. 1, as a vibration sensing device in a knocking detection system of the invention by designing the vibration pickup such that the resonance frequency $f_O'$ of the pickup 10 falls in the knocking frequency band. In the case of the vibration pickup 10 of FIG. 1, $$f_O' = \frac{1}{2\pi}\sqrt{\frac{k'}{m}}$$

where k' is the spring constant of the spring 18, and m is the mass of the seismic mass 16. Therefore, the resonance frequency $f_O'$ can be made to take a value within the range of 5–10 KHz by appropriately determining the mass m and the spring constant k'.

FIG. 6 shows a knocking detection system of the invention in block diagram. The above described vibration sensing device 30 attached to the engine body 20 picks up vibrations attributable to knocking of the engine among mechanical vibrations of a wide frequency range produced by combustion in each cylinder of the engine and provides an electrical output signal V representing vibrations in the knocking frequency band. In this embodiment the knocking detection system has a peak detector 32 which is intermittently set or reset by, for example, an ignition signal for each engine cylinder to receive the vibration signal V from the vibration sensing device 30 and detects a peak value of the vibration signal V upon each occurrence of ignition in the engine.

The intensity of knocking of the engine can be judged from peak values of the vibration-indicating signal V, but, as is accepted, the rate of engine revolution should be taken into consideration in actually judging the knocking intensity.

Figure 7:
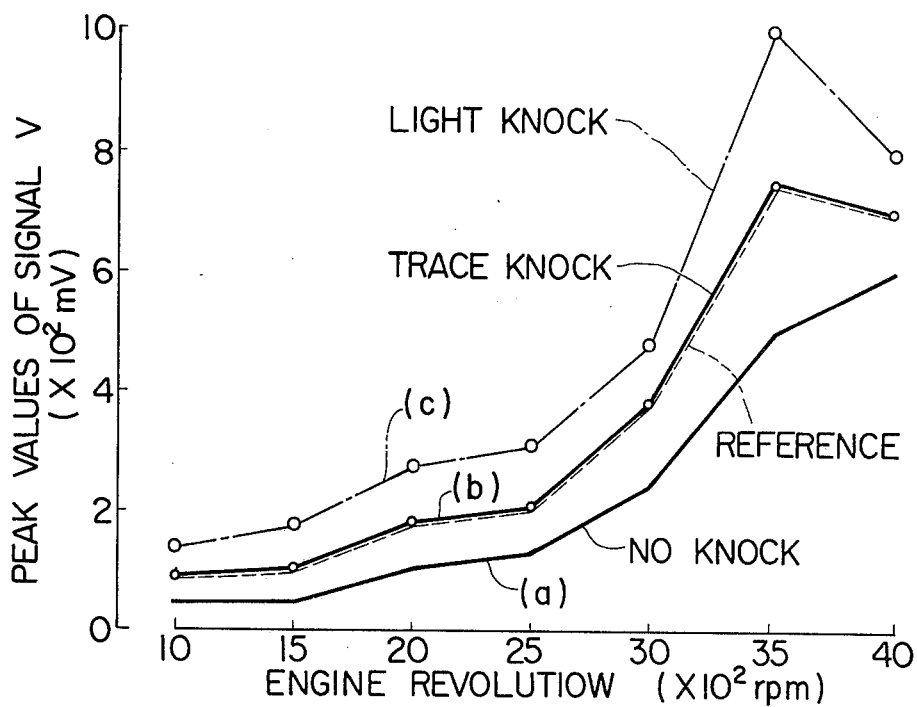
FIG. 7 is a chart showing variations in the relationship between the engine revolution rate and amplitude peaks of vibration signals produced by a vibration sensing device in a system of the invention with the intensity of engine knocking.

FIG. 7 shows the dependence of peak values of the vibration-indicating signal V on the rate of revolution of an automotive gasoline engine. While the engine is operating substantially without knocking, peak values of the signal V vary with a rise in the revolution rate as represented by the curve (a). When the engine exhibits trace knocking, the dependence of peak values of the signal V is as represented by the curve (b), and a more significantly knocking condition is represented by the curve (c). Accordingly peak values of the signal V are a direct indication of the intensity of knocking of the engine when the engine speed is detected simultaneously.

The knocking detection system of FIG. 6 comprises a conventional revolution sensor 34 which provides an electrical signal E representing the rate of engine revolution and a function generator 36 which receives the engine speed signal E and, based on this signal E, produces a reference signal R which is a variable signal having a predetermined relationship with the rate of engine revolution. For example, the reference signal R is made to agree with the curve (b) (representing trace knocking) in FIG. 7. The detection system further comprises a comparator 38 which receives the reference signal R and a peak-indicating signal P produced by the peak detector 32 and makes a comparison between these two signals R and P upon each occurrence of ignition in each combustion chamber of the engine. The comparator 38 produces a knock-indicating signal S each time when a peak value of the vibration-indicating signal V is greater than the reference signal R at that moment, and this signal S is supplied to a knocking condition indicator 40.

Optionally, the knock-indicating signal S may be supplied to an ignition timing control system 42 which has the function of retarding ignition timing when knocking is detected, so that the engine may not remain in a knocking state.

The system of FIG. 6 may optionally be modified into a knocking detection system shown in FIG. 8. Essentially, this modification is the addition of a digital counter 44 and another comparator 46 between the knocking-level comparator 38 and the indicator 40 in FIG. 6. The counter 44 is controlled by a signal E' supplied from the engine revolution sensor 34 such that a gate open period $T_n$ of this counter 44 shortens as the rate of engine revolution increases. As will be understood, the knock-indicating signal S provided by the knock level comparator 38 is a pulse signal. The counter 44 has the function of counting the number of pulses S (i.e. the number of occurrence of a condition where the peak-indicating signal P has a greater amplitude than the reference signal R) during each gate open period $T_n$.

Figure 9:
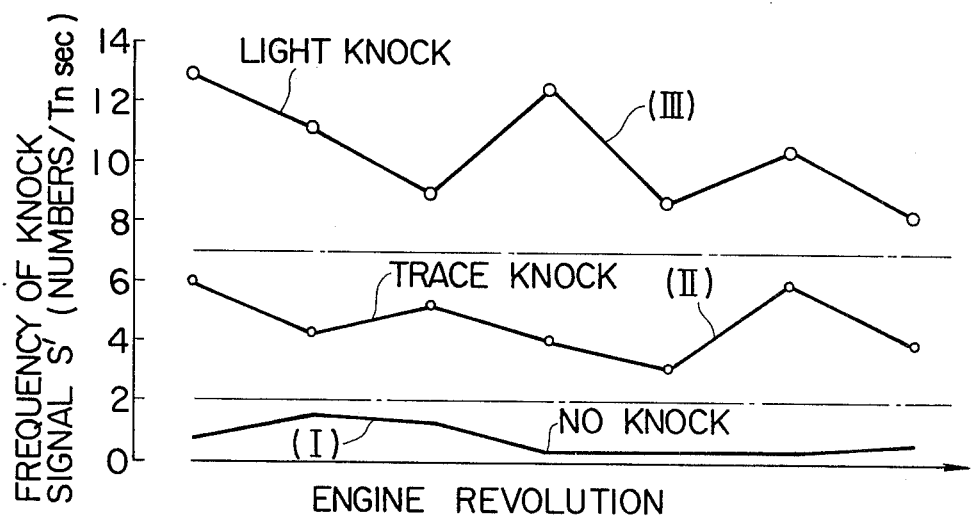
FIG. 9 is a chart illustrating the nature of knocking indication signals produced in the system of FIG. 8.

The number of pulses S counted by the counter 44 during each time period $T_n$ is put into the comparator 46 as a signal N. In this comparator 46, the signal N is compared with reference numbers stored in the comparator 46 such that a knock-indicating signal S' produced by this comparator 46 and supplied to an indicator 40A indicates the degree of engine knocking based on the frequency of the pulses S. As illustrated in FIG. 9 by way of example, the indicator 40A indicates that the engine is not knocking when the frequency of the pulses S is not greater than $2/T_n$ as represented by the curve (I), that the engine exhibits a trace knocking when the frequency of the pulses S is greater than $2/T_n$ but is not greater than $7/T_n$ as represented by the curve (II) and that the engine is more significantly knocking when the pulse frequency is greater than $7/T_n$ as represented by the curve (III). Though the system of FIG. 8 is complicated compared with the system of FIG. 6, the former system gives a more precise information about knocking conditions of the engine. Optionally, the knock-indicating signal S' produced by the knocking frequency comparator 46 in the system of FIG. 8 may be supplied to the aforementioned ignition timing control system 42 thereby to avoid continuation or progressive intensification of engine knocking.

As will be understood from the foregoing description, a knocking detection system according to the invention can detect the degree of engine knocking accurately and precisely despite its relatively simple circuitry including no band-pass filter. A system of the invention, therefore, is quite suitable for applications to automotive engines.

What is claimed is:

1. A system for detecting the degree of knocking of an internal combustion engine, the system comprising:
   a vibration sensing device which is attached to a body of an internal combustion engine and comprises a vibration pickup which has a housing and a seismic mass resiliently held in said housing and is capable of converting mechanical vibrations into electrical signals, and a resonance plate means fixed only in one end region thereof to said body of said engine for mechanically amplifying only those vibrations having a frequency within a band attributable to knocking of said engine, said housing of said vibration pickup being fixedly mounted on said resonance plate in a free end region distant from said one end region, said vibration sensing device, as an assembly of said pickup and said resonance plate, having a resonance frequency within a frequency band of vibrations attributable to knocking of said engine;
   reference signal producing means for producing an electrical reference signal which is variable depending on the rate of revolution of said engine; and
   signal treatment means for producing an electrical knock-indicating signal which represents the degree of knocking of said engine based on a comparison of an electrical vibration-indication signal derived from said vibration sensing device with said reference signal.

2. A system according to claim 1, wherein said resonance frequency is in the range from about 5 KHz to about 10 KHz.

3. A system according to claims 1 wherein said signal treatment means comprise a peak detection means for intermittently detecting peak values of an electrical signal produced by said vibration sensing device and producing a peak-indicating signal representing each of the detected peak values, and a comparison means for comparing each peak value represented by said peak-indicating signal with said reference signal and producing a knock-indicating signal each time when the compared peak value is greater than a value represented by said reference signal at the moment of comparison.

4. A system according to claim 3, further comprising knock-frequency detection means for producing a knock-frequency signal representing the degree of knocking of said engine based on the frequency of the production of said knock-indicating signal by said comparison means.

5. A system according to claim 4, wherein said knock-frequency detection means comprise a digital counter for counting the number of occurrence of said knock-indicating signal during each gate open period and producing a signal representing the counted number, means for varying said each gate open period such that said each gate open period is shortened as the rate of revolution of said engine increases and another comparison means for producing said knock-frequency signal based on said signal produced by said counter.

6. A system according to claim 1, wherein said vibration pickup is of the type having a piezoelectric element which produces an electrical signal in response to deflection of said seismic mass caused by mechanical vibrations.

* * * * *